Nov. 3, 1931.  F. KÖSTER  1,829,867
HOLDER FOR PHOTOGRAPHIC COLOR FILTERS
Filed Feb. 7, 1930

Patented Nov. 3, 1931

1,829,867

UNITED STATES PATENT OFFICE

FRIEDRICH KÖSTER, OF FRANKFORT-ON-THE-MAIN, GERMANY

HOLDER FOR PHOTOGRAPHIC COLOR FILTERS

Application filed February 7, 1930, Serial No. 426,704, and in Germany February 7, 1929.

This invention relates to a holder for photographic color filters, extension lenses and the like. The holder consists of a narrow ring shaped piece leaving free the lens aperture and having clamping devices for attachment on the smooth cylinder of the lens-mounting.

According to the invention two narrow ring-shaped holders, connected the one with the other by a hinge and adapted to be locked together by a snap lock arranged opposite the hinge, may be used for attaching the filter or the extension lens, one of said holders having in its inner surface a circular depression for supporting round filters, the other holder having a depression similar to a slide guide for guiding rectangular filters, whereas between the two holders two ring-shaped springs are located, the ends of which are fixed near the perpendicular centre line, the not fixed portions of said springs being bent into the hollow space between the two holders. The very thin and sensitive springs for pressing on the filters and the extension lenses are consequently enclosed in the hollow space between the two resistant holders.

Two embodiments of the invention are illustrated by way of example in the accompanying drawings in which.

Figure 1:
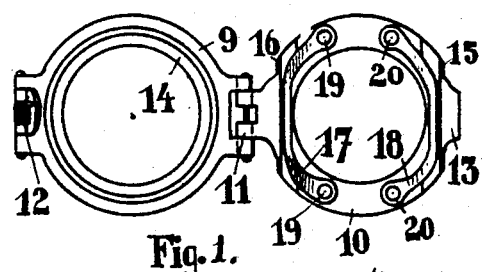
Fig. 1 shows in front elevation the double holder in open position.
Figure 2:
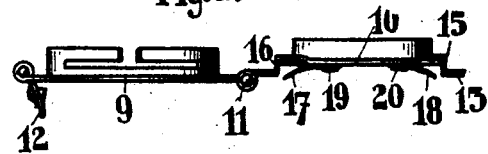
Fig. 2 shows in top plan view also in the open position.
Figure 4:
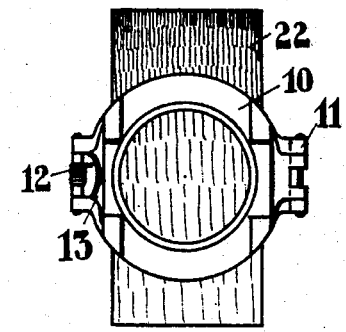
Fig. 4 is a similar view as Fig. 3.
Figure 3:
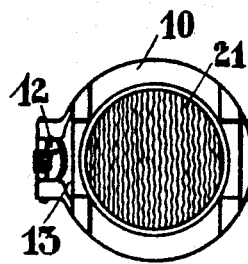
Fig. 3 shows in front elevation the device for a round color filter.
Figure 5:
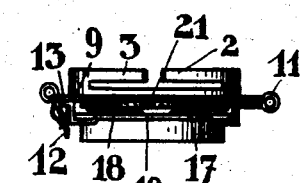
Fig. 5 shows the arrangement according to Fig. 3 in top plan view partly in section.
Figure 6:
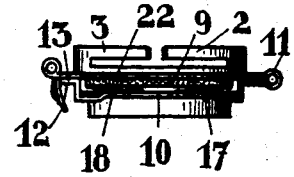
Fig. 6 is a similar view as shown in Fig. 4.

In the drawings 9 is the one ring shaped carrier and 10 the other ring shaped carrier. These two carriers are connected by a hinge 11 and can be locked in the position the one lying on the other with the aid of a snap lock 12, 13 situated diametrically opposite the hinge 11. The ring shaped carrier 9, has a circular depression 14 which is wide enough to enable the different round extension lenses and filters to obtain a sufficiently large bearing surface. The ring shaped carrier 10 is provided with slide bars 15 and 16 which enable rectangular filters to be pushed in perpendicularly to the centre line determined by the hinge 11 and the snap lock 12, 13. The width determined by the slide bars 15 and 16 is also chosen sufficiently large to enable the different sizes of slides to obtain sufficient bearing surface.

The springs 17 and 18, necessary for pressing the filters and extension lenses onto the bearing surfaces, are also made approximately circular and fixed by rivets 19 and 20 onto the carrier 10 but in such a manner that the parts of the springs 17 and 18 which are not fastened extend into the gap between the two carriers 9 and 10. Consequently the springs 17 and 18 are protected between the two ring shaped carriers 9 and 10 so that they cannot be damaged or bent and nevertheless produce a sufficiently great pressing on pressure if a round filter 21 or a rectangular filter 22 is inserted. 2 and 3 are resilient grippers by means of which the device described is slipped over the edge of the lens.

I claim:—

A device for clamping color filters, extension lenses and the like on lens casings, comprising in combination two narrow ring shaped carriers, a hinge connecting said carriers, a snap lock on said carriers opposite said hinge adapted to lock said carriers one of said carriers having a circular depression for supporting round filters, slide bars on the other of said carriers adapted to guide rectangular filters, two springs between said carriers fastened with their ends near the perpendicular centre line the free ends of said springs being bent into the space between the two carriers.

In testimony whereof I affix my signature.

FRIEDRICH KÖSTER.